United States Patent
Kim et al.

(10) Patent No.: US 11,636,751 B2
(45) Date of Patent: Apr. 25, 2023

(54) SYSTEM FOR DETECTING OCCUPANT LEFT UNATTENDED IN VEHICLE AND METHOD THEREOF

(71) Applicant: HYUNDAI MOBIS CO., LTD., Seoul (KR)

(72) Inventors: Gun Woo Kim, Seongnam-si (KR); Sun Bin Yim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 19 days.

(21) Appl. No.: 17/458,684

(22) Filed: Aug. 27, 2021

(65) Prior Publication Data
US 2022/0068108 A1    Mar. 3, 2022

(30) Foreign Application Priority Data
Sep. 1, 2020   (KR) .......................... 10-2020-0111092

(51) Int. Cl.
| | | |
|---|---|---|
| G08B 21/00 | (2006.01) | |
| G08B 21/14 | (2006.01) | |
| B60W 40/08 | (2012.01) | |
| B60W 50/00 | (2006.01) | |

(52) U.S. Cl.
CPC .............. G08B 21/14 (2013.01); B60W 40/08 (2013.01); B60W 50/0098 (2013.01); B60W 2540/01 (2020.02); B60W 2540/049 (2020.02); B60W 2540/221 (2020.02)

(58) Field of Classification Search
CPC ... G08B 21/14; B60W 40/08; B60W 50/0098; B60W 2540/01; B60W 2450/049; B60W 2450/221; B60W 50/14; B60W 2756/10; B60R 21/0153; B60R 21/01566; B60H 1/00742; B60H 1/00764; B60H 1/008; B60J 1/08; B60J 5/047; B60Y 2302/03; B60Y 2400/302
See application file for complete search history.

(56) References Cited

U.S. PATENT DOCUMENTS

| | | | | |
|---|---|---|---|---|
| 4,221,206 A | * | 9/1980 | Haas | F02B 77/08 |
| | | | | 73/23.31 |
| 8,803,696 B1 | * | 8/2014 | Dunyan | E05F 15/72 |
| | | | | 454/343 |
| 2011/0040451 A1 | * | 2/2011 | Lee | B60R 21/0132 |
| | | | | 701/45 |
| 2017/0158186 A1 | * | 6/2017 | Soifer | B60H 1/00742 |
| 2017/0309159 A1 | * | 10/2017 | Pimentel | G08B 21/12 |

FOREIGN PATENT DOCUMENTS

KR    20190116776 A    10/2019

* cited by examiner

Primary Examiner — Ojiako K Nwugo
(74) Attorney, Agent, or Firm — NovoTechIP International PLLC

(57) ABSTRACT

According to the present invention, a system for detecting an occupant left unattended in a vehicle, including a first detection unit that detects a situation in which a vehicle is stopped or parked; a carbon dioxide measurement unit that measures carbon dioxide concentration inside the vehicle; and a determination unit that detects the first detection unit's detection of the situation in which the vehicle is stopped or parked, and determines whether or not an occupant is left unattended in the vehicle based on the carbon dioxide concentration measured by the carbon dioxide measurement unit is disclosed.

19 Claims, 5 Drawing Sheets

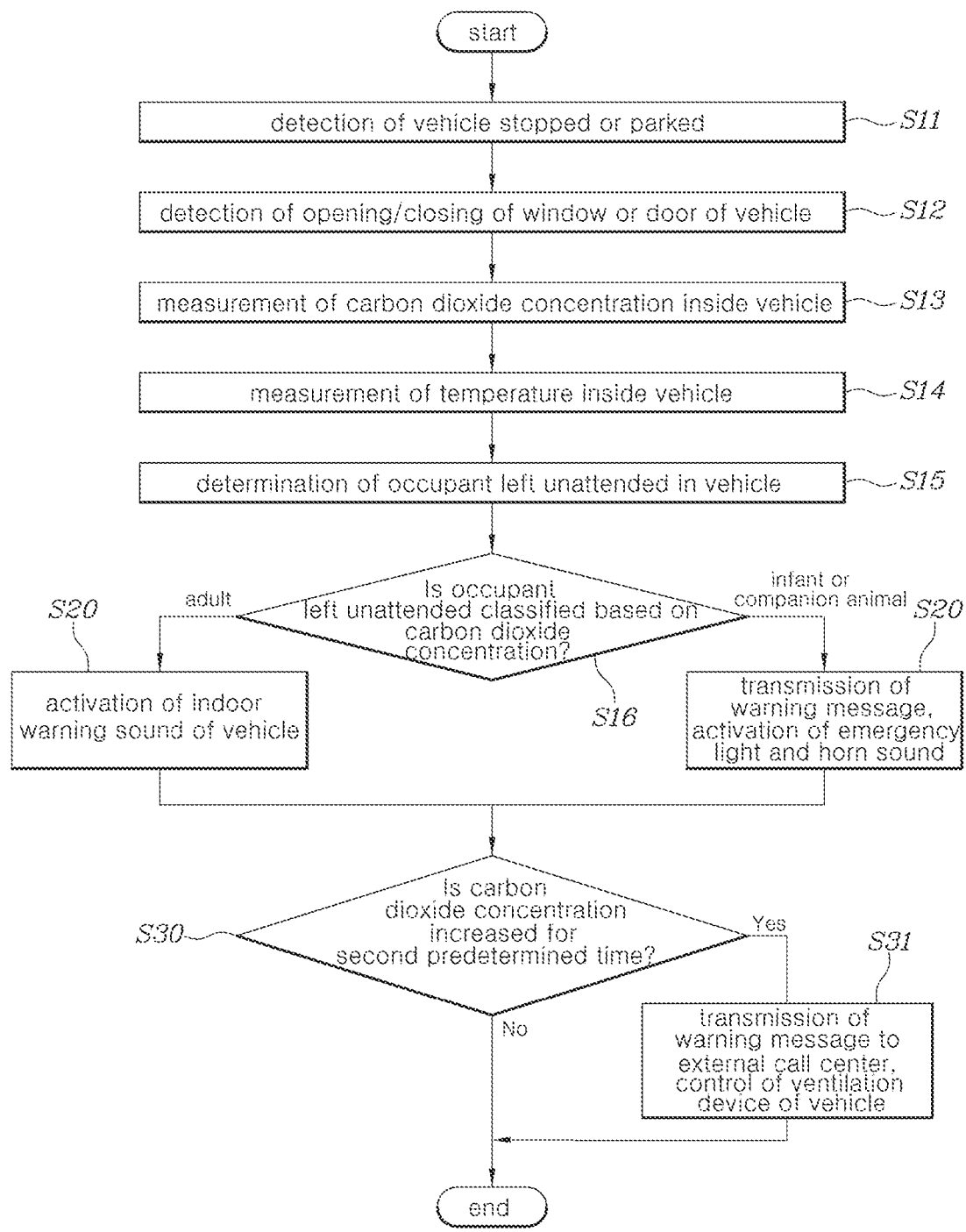

SYSTEM FOR DETECTING OCCUPANT LEFT UNATTENDED IN VEHICLE AND METHOD THEREOF

CROSS-REFERENCE TO RELATED APPLICATIONS

The present application claims priority to Korean Patent Application No. 10-2020-0111092, filed Sep. 1, 2020, the entire contents of which is incorporated herein for all purposes by this reference.

BACKGROUND OF THE INVENTION

1. Field of the Invention

The present invention relates to a system for detecting an occupant left unattended in a vehicle.

2. Discussion of Related Art

Often the media reports of accidents in which a child suffocating in a vehicle is found long afterward.

If children in the vehicle do not get out of the vehicle because of dozing or falling asleep, the children may get caught in the vehicle and suffocate. Also, this may be found after a long time in people other than a driver.

These accidents occur because the driver does not carefully identify children whose intentions are not clear, and such accidents cannot be prevented from reoccurring unless special measures are taken.

Since there is a limit to looking at who is riding in a vehicle by the same person, it is necessary to accurately identify the number of occupants in a vehicle in real time and take measures so that there are no children left in the vehicle.

The matters described as the background art above are only for improving the understanding of the background of the present invention, and should not be accepted as acknowledging that they correspond to the prior art already known to those of ordinary skill in the art.

BRIEF SUMMARY OF THE INVENTION

The present invention has been proposed to solve this problem, and a purpose of the present invention is to prepare for an occupant left unattended in a vehicle from being in a dangerous situation by detecting the occupant left unattended in the vehicle that is stopped or parked and whose windows are closed with a carbon dioxide concentration pattern, classifying the occupant left unattended, and notifying this to an outsider or reducing the carbon dioxide concentration of the vehicle.

The system for detecting an occupant left unattended in a vehicle according to the present invention includes a first detection unit that detects whether a vehicle is stopped or parked; a carbon dioxide measurement unit that measures carbon dioxide concentration inside the vehicle; and a determination unit that detects the first detection unit's detection of the situation in which the vehicle is stopped or parked, and determines whether or not an occupant is left unattended in the vehicle based on the carbon dioxide concentration measured by the carbon dioxide measurement unit.

The system may further include a second detection unit that detects opening or closing a window or door of the vehicle when the first detection unit detects whether the vehicle is stopped or parked.

The carbon dioxide measurement unit measures an increase/decrease pattern of the carbon dioxide concentration inside the vehicle, and the determination unit classifies the occupant left unattended in the vehicle based on the increase/decrease pattern of the carbon dioxide concentration measured by the carbon dioxide measurement unit.

The determination unit determines that an adult occupant is left unattended in the vehicle when the carbon dioxide measurement unit measures that the carbon dioxide concentration inside the vehicle increases to more than or equal to a first predetermined concentration within a predetermined time period.

The determination unit determines that an infant or a companion animal is left unattended in the vehicle when the carbon dioxide measurement unit measures that the concentration of carbon dioxide inside the vehicle increases to more than or equal to a second predetermined concentration within a predetermined time period.

The system may further include a control unit that controls the vehicle to notify an outside occupant whether or not an occupant is left unattended in the vehicle when the determination unit determines whether or not the occupant is left unattended.

The control unit transmits a warning message to a predetermined contact when the determination unit determines whether or not the occupant is left unattended in the vehicle.

The control unit activates a warning light or a warning sound inside or outside the vehicle when the determination unit determines whether or not the occupant is left unattended in the vehicle.

the control unit controls a ventilation device of the vehicle to adjust the carbon dioxide concentration inside the vehicle when the determination unit determines whether or not the occupant is left unattended in the vehicle.

The system may further include a temperature measurement unit that measures an indoor temperature of the vehicle. The determination unit determines that the occupant is left unattended when the indoor temperature is increased to a predetermined temperature for within a predetermined time period.

The method for detecting an occupant left unattended in a vehicle according to the present invention includes a first detection step of detecting whether a vehicle is stopped or parked; a carbon dioxide measurement step of measuring carbon dioxide concentration inside the vehicle; and a first determination step of detecting the situation in which the vehicle is stopped or parked in the first detection step, and determining whether or not an occupant is left unattended in the vehicle based on the carbon dioxide concentration measured in the carbon dioxide measurement step.

The method may further include a second detection step of detecting an opening or closing of a window or door of the vehicle when it is determined in the first detection step that the vehicle is stopped or parked.

The carbon dioxide measurement step measures an increase/decrease pattern of the carbon dioxide concentration inside the vehicle, and the method further include, after the first determination step, a classification step of classifying an occupant left unattended in the vehicle into an adult, an infant or a companion animal based on the increase/decrease pattern of the carbon dioxide concentration measured in the carbon dioxide measurement step.

In the classification step, it is determined that the occupant left unattended in the vehicle is classified as the adult occupant when it is measured in the carbon dioxide measurement step that the carbon dioxide concentration inside the vehicle increases to more than or equal to a first predetermined concentration for a first predetermined time.

In the classification step, it is determined that the occupant left unattended in the vehicle is classified as the infant or the companion animal when it is measured in the carbon dioxide measurement step that the carbon dioxide concentration inside the vehicle increases to more than or equal to a second predetermined concentration for a first predetermined time.

The method may further include a first control step of controlling the vehicle to notify the occupant left unattended or an outside occupant whether or not the occupant is left unattended in the vehicle when the occupant left unattended is classified in the classification step.

In the first control step, when the occupant left unattended in the vehicle is classified as the infant or the companion animal in the classification step, that the occupant is left unattended is notified to an outside by transmitting a warning message to a predetermined contact or through a vehicle emergency light or horn sound.

In the first control step, when the occupant left unattended in the vehicle is classified as the adult in the classification step, an indoor warning sound of the vehicle is activated.

The method may further include, after the first control step, a second determination step of determining that the carbon dioxide concentration of the vehicle is increased for a second predetermined time period.

The method may further include a second control step of transmitting a warning message to an external call center stored in the vehicle or controlling a ventilation device of the vehicle to adjust the carbon dioxide concentration inside the vehicle when it is determined in the second determination step that the carbon dioxide concentration increases for the second predetermined time.

The method may further include a temperature measuring step of measuring an indoor temperature of the vehicle before the first determination step, and in the first determining step, it is determined that the occupant is left unattended when the indoor temperature increases to a predetermined temperature for a first predetermined time.

A system for detecting an occupant left unattended in a vehicle according to the present invention detects whether or not an occupant is left unattended in the vehicle by an increase/decrease pattern of carbon dioxide concentration, and the system has the effect of notifying to an outsider through a warning or the like of the vehicle by a control unit, or the effect of waking up the occupant left unattended in the vehicle.

In addition, there is an effect that an active response can be taken by classifying whether the occupant left in the vehicle is an adult, an infant, or a companion animal through the increase/decrease pattern of the carbon dioxide concentration measured by a carbon dioxide measurement unit.

In addition, there is an effect that when it cannot be notified to an outsider, the control unit operates a window or an air conditioning device of the vehicle to reduce the carbon dioxide concentration inside the vehicle.

BRIEF DESCRIPTION OF THE DRAWINGS

FIG. 5 is a flowchart of a method for detecting an occupant left unattended in a vehicle according to an embodiment of the present invention.

DETAILED DESCRIPTION OF THE INVENTION

Figure 1:
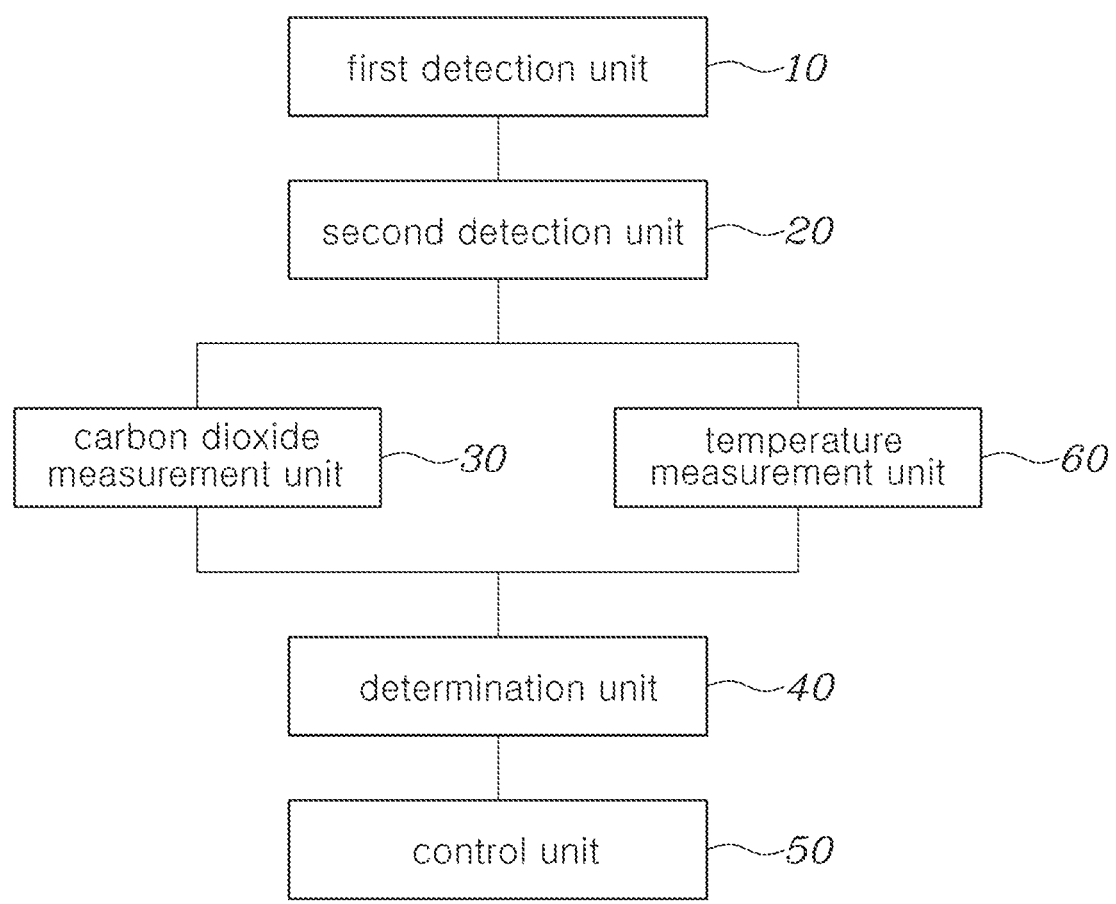
FIG. 1 is a block diagram of a system for detecting an occupant left unattended in a vehicle according to an embodiment of the present invention.

Specific structural or functional descriptions of the embodiments of the present invention disclosed in the present specification or application are only exemplified for the purpose of describing the embodiments according to the present invention, and the embodiments according to the present invention are implemented in various forms and should not be construed as being limited to the embodiments described in the present specification or application.

Since the embodiment according to the present invention may have various changes and forms, specific embodiments will be illustrated in the drawings and described in detail in the present specification or application. However, this is not intended to limit the embodiment according to the concept of the present invention with respect to a specific disclosed form, and should be understood to include all changes, equivalents or substitutes included in the spirit and scope of the present invention.

Terms such as first and/or second may be used to describe various elements, but the elements should not be limited by the terms. The above terms are used only for the purpose of distinguishing one element from another element, for example, without departing from the scope of the present invention, a first element may be termed a second element, and similarly the second component may also be referred to as the first component.

When a component is referred to as being "connected" or "contacted" to another component, it may be directly connected or contacted to another component, but it is understood that another component may exist in between. On the other hand, when it is said that a certain element is "directly connected" or "directly contacted" to another element, it should be understood that another element does not exist in the middle. Other expressions describing the relationship between elements, such as "between" and "immediately between" or "adjacent to" and "directly adjacent to", etc., should be interpreted similarly.

The terms used herein are used only to describe specific embodiments, and are not intended to limit the present invention. The singular expression includes the plural expression unless the context clearly dictates otherwise. In this specification, terms such as "comprise" or "have" are intended to designate that an embodied feature, number, step, operation, component, part, or combination thereof exists, and it should be understood that it does not preclude in advance the possibility of the existence or addition of one or more other features or numbers, steps, operations, components, parts, or combinations thereof.

Unless defined otherwise, all terms used herein, including technical and scientific terms, have the same meaning as commonly understood by one of ordinary skill in the art to which this invention belongs. Terms such as those defined in commonly used dictionaries should be interpreted as meanings consistent with the context of the related art, and unless explicitly defined in the present specification, they are not to be interpreted in an ideal or excessively formal meaning.

Hereinafter, the present invention will be described in detail by describing preferred embodiments of the present invention with reference to the accompanying drawings. Like reference numerals in each figure indicate like elements.

In an exemplary embodiment of the present invention, a first detection unit 10, a second detection unit 20, a measurement unit, a determination unit 40, and a control unit 50 may be implemented by an algorithm configured to control the operations of various components of a vehicle 100, a non-volatile memory (not shown) configured to store data relating to software instructions for reproducing the algorithm, and a processor (not shown) configured to perform the operations described below using the data stored in the memory. Here, the memory and the processor may be implemented as separate chips. Alternatively, the memory and processor may be implemented as a single chip integrated with each other. A processor may take the form of one or more processors.

Figure 2:
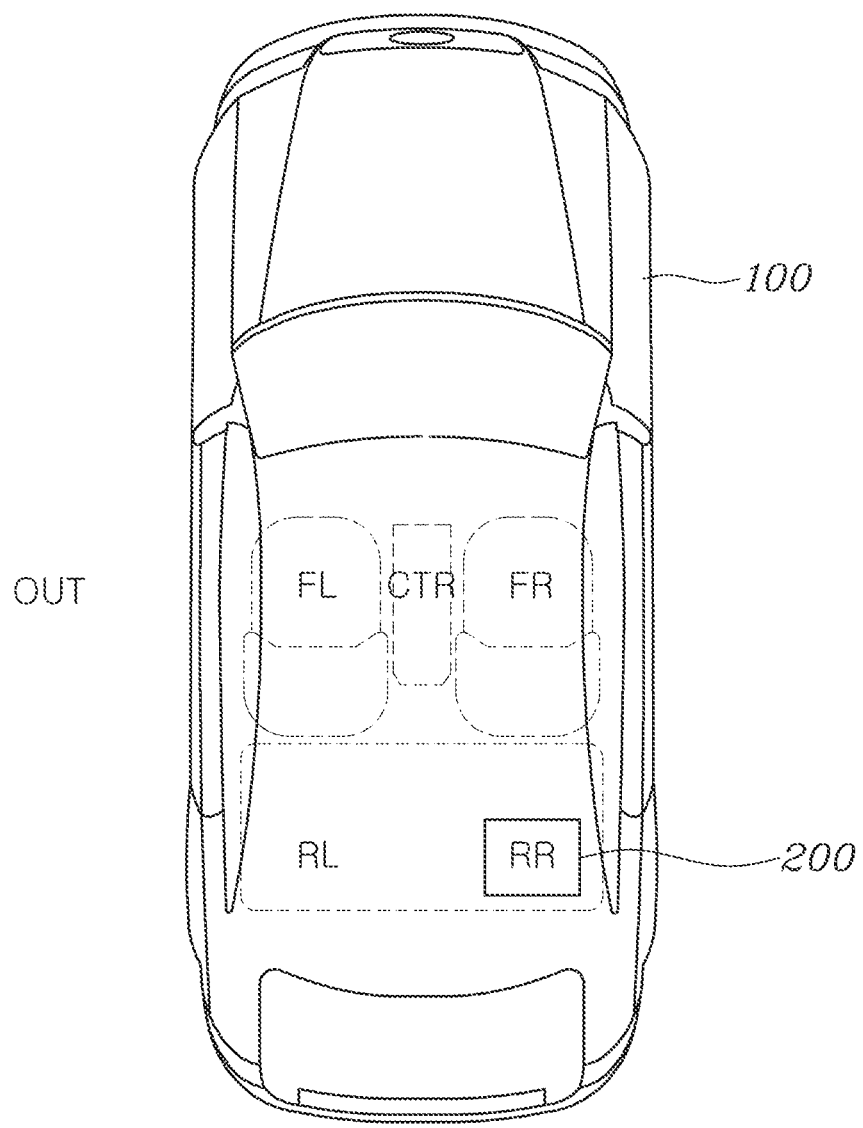
FIG. 2 is a plan view of a vehicle in which seats are divided.
Figure 3:
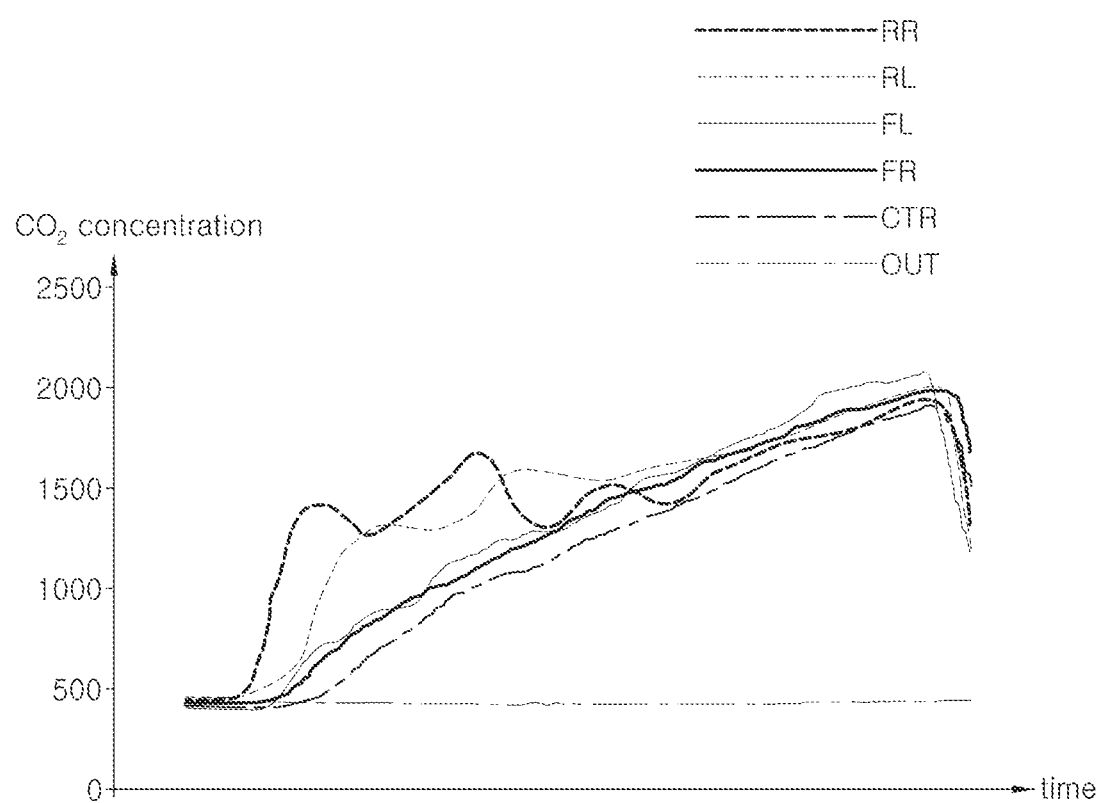
FIG. 3 is a graph illustrating an increase or decrease in carbon dioxide concentration according to a seat position of a vehicle when an adult occupant is left unattended in the rear seat of the vehicle.
Figure 4:
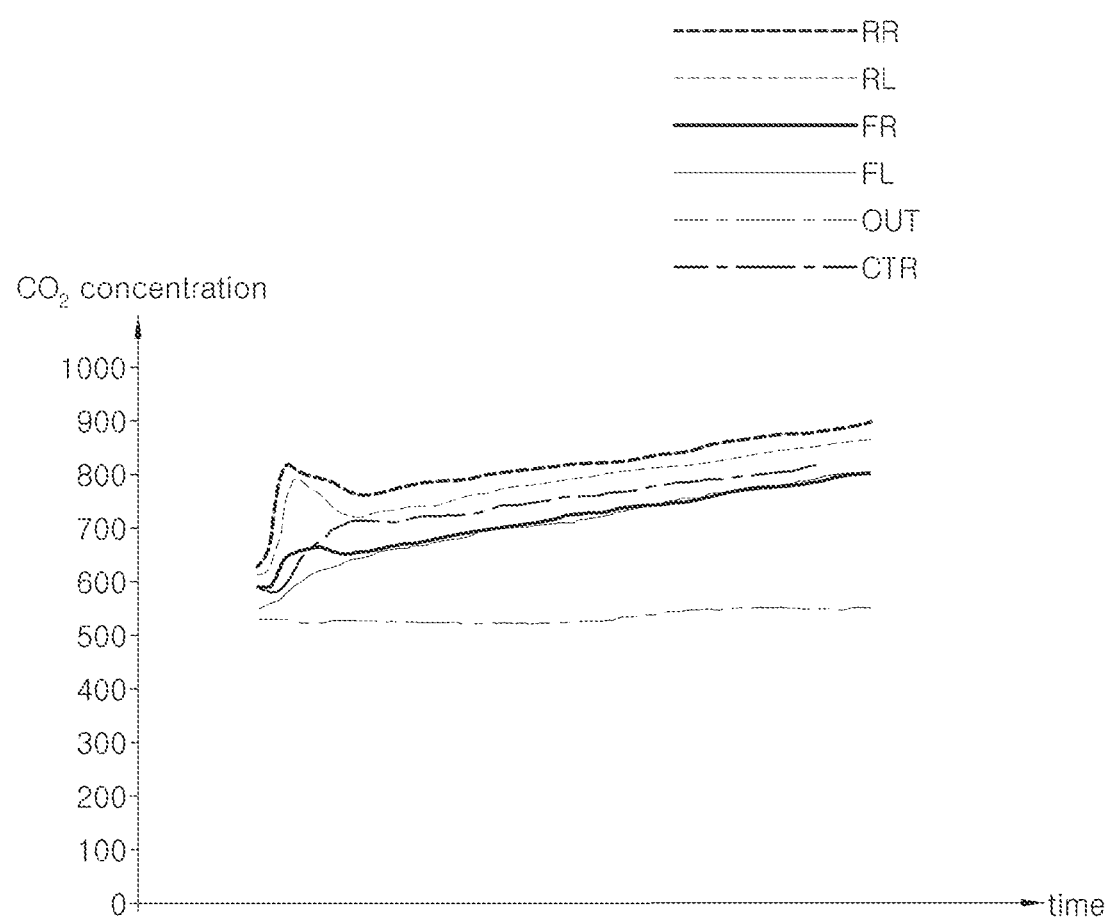
FIG. 4 is a graph showing an increase or decrease in carbon dioxide concentration according to a seat position of a vehicle when an infant or a companion animal is left unattended in the rear seat of the vehicle.

FIG. 1 is a block diagram of a system for detecting an occupant left unattended in a vehicle 100 according to an embodiment of the present invention. FIG. 2 is a plan view of the vehicle 100 in which the seats of the vehicle 100 are divided. FIG. 3 is a graph illustrating an increase or decrease in carbon dioxide concentration according to a seat position of the vehicle 100 when an adult occupant is left unattended in the rear seat of the vehicle 100. FIG. 4 is a graph illustrating an increase or decrease in carbon dioxide concentration according to a seat position of the vehicle 100 when an infant or a companion animal is left unattended in the rear seat of the vehicle 100.

A preferred embodiment of the system for detecting an occupant left unattended in the vehicle 100 according to the present invention will be described with reference to FIGS. 1 to 4 accompanied below.

When a driver of the vehicle 100 leaves the vehicle 100 after stopping or parking the vehicle 100, an occupant may be left unattended in the vehicle 100 with the windows and doors of the vehicle 100 locked. When an occupant is left unattended in the vehicle 100, the occupant left unattended in the vehicle 100 may be in danger due to an increase in the carbon dioxide concentration inside or within the vehicle 100.

The system for detecting an occupant left unattended in the vehicle 100 according to the present invention can detect an occupant left unattended in the vehicle 100, and notify this to the driver or an occupant who has left the vehicle 100 or control the vehicle 10, thereby allowing to escape from a dangerous situation.

The system for detecting an occupant left unattended in the vehicle 100 according to the present invention includes, in particular, the first detection unit 10 that detects whether the vehicle 100 is stopped or parked, a carbon dioxide measurement unit 30 that measures carbon dioxide concentration inside the vehicle 100, and the determination unit 40 that determines whether or not an occupant is left unattended in the vehicle 100 based on the first detection unit 10's detection of the situation in which the vehicle 100 is stopped or parked, and the carbon dioxide concentration measured by the carbon dioxide measurement unit 30.

Referring further to FIG. 1, the first detection unit 10 may detect that the driver stops or parks the vehicle 100 and leaves the vehicle 100. When the driver leaves the vehicle 100, an occupant of the vehicle 100 sleeping or an infant or a companion animal who cannot control the vehicle 100 may be left in the vehicle 100.

The carbon dioxide measurement unit 30 may measure the carbon dioxide concentration inside the vehicle 100 and transmit the measured value to the determination unit 40.

When the first detection unit 10 detects whether the vehicle 100 is stopped or parked and the carbon dioxide concentration measured by the carbon dioxide measurement unit 30 increases within a predetermined time period, the determination unit 40 determines that an occupant is left unattended in the vehicle 100. The system for detecting an occupant left unattended in the vehicle 100 according to the present invention is terminated when the carbon dioxide concentration is not increased and is constant.

When an occupant is left unattended in the vehicle 100, the unattended occupant may be in a situation where it is difficult to breathe due to an increase in carbon dioxide concentration, and if the occupant cannot control the vehicle 100, the occupant's life may be impaired.

The determination unit 40 determines whether or not the occupant is left unattended through the first detection unit 10 and the carbon dioxide measurement unit 30, and thus there is an effect of preparing for the situation in which the occupant left unattended in the vehicle 100 is in danger due to an increase in the carbon dioxide concentration in the vehicle.

The second detection unit 20 may be further included. The second detection unit 20 detects the opening or closing of a window or door of the vehicle 100 if the first detection unit 10 detects that the vehicle 100 is stopped or parked.

The first detection unit 10 may detect whether the vehicle 100 is stopped or parked, the second detection unit 20 may detect a situation in which both the window and the door of the vehicle 100 are closed, and the carbon dioxide measurement unit 30 may measure the carbon dioxide concentration and an increase in the carbon dioxide concentration inside the vehicle 100. Since the carbon dioxide concentration does not increase if the second detection unit 20 detects that either the window or door of the vehicle 100 is not closed, there is no need to measure the carbon dioxide concentration by the carbon dioxide measurement unit 30.

Accordingly, the second detection unit 20 detects that the window or door of the vehicle 100 is closed, thereby improving the measurement efficiency of the carbon dioxide measurement unit 30.

The carbon dioxide measurement unit 30 measures the increase/decrease pattern of the carbon dioxide concentration inside the vehicle 100, and the determination unit 40 classifies the occupant left unattended in the vehicle 100 based on the increase/decrease pattern of the carbon dioxide concentration measured by the carbon dioxide measurement unit 30.

Referring further to FIGS. 2 to 4, when an occupant of the vehicle 100 is left unattended according to the classification of the seat of the vehicle 100 of FIG. 2, the increase/decrease pattern of the carbon dioxide concentration inside the vehicle 100 can be measured as in FIGS. 3 to 4.

The carbon dioxide measurement unit 30 may measure the carbon dioxide concentration inside the vehicle 100 within a predetermined time period in a situation where the vehicle 100 is parked in a stopped or started off state, and all the doors and windows of the vehicle 100 are closed, and transmit the corresponding data to the determination unit 40.

When the increase/decrease pattern of the carbon dioxide concentration in the vehicle 100 received from the carbon dioxide measurement unit 30 is greater than a predetermined slope or the carbon dioxide concentration increases to more than a predetermined value, it may be determined that an occupant is left unattended in the vehicle 100.

Through this, it is possible to accurately determine the situation in which the occupant of the vehicle 100 is left unattended, and there is an effect that can be prepared for the occupant being left unattended in the vehicle 100 and being in a dangerous situation such as difficulty breathing.

When the carbon dioxide measurement unit 30 measures that the carbon dioxide concentration inside the vehicle 100 increases to more than a first predetermined concentration within a predetermined time period, the determination unit 40 determines that an adult occupant is left unattended in the vehicle 100.

Referring further to FIG. 3, when the carbon dioxide concentration measured by the carbon dioxide measurement unit 30 is increased to more than the first predetermined concentration for the predetermined time, the determination unit 40 may determine that the occupant left unattended in the vehicle 100 is an adult.

When it is determined that the occupant left unattended in the vehicle 100 is an adult, the adult occupant can control the vehicle 100. If the adult occupant does not control the vehicle 100 until the carbon dioxide concentration increases to the first predetermined concentration, it can be determined that the adult occupant is in a sleeping state.

When the carbon dioxide measurement unit 30 measures that the carbon dioxide concentration inside the vehicle 100 increases to more than a second predetermined concentration for the predetermined time, the determination unit 40 determines that an infant or a companion animal is left unattended in the vehicle 100.

Referring further to FIG. 4, when an infant or a companion animal is left unattended in the vehicle 100, an increase/decrease pattern of the carbon dioxide concentration can be confirmed.

When the occupant left unattended in the vehicle 100 is an infant or a companion animal other than an adult, the increase/decrease pattern of the carbon dioxide concentration may be measured differently from that of an adult.

The carbon dioxide measurement unit 30 may measure the carbon dioxide concentration when the occupant left unattended is an infant or a companion animal and transmit the measurement data to the determination unit 40, and the determination unit 40 may determine that the occupant left unattended in the vehicle 100 is an infant or a companion animal if the carbon dioxide concentration for the predetermined time increases to more than the second predetermined concentration.

The situation in which an infant or a companion animal is left unattended in the vehicle 100 may be more dangerous than a situation in which an adult occupant is left unattended. The determination unit 40 has an effect of quickly determining whether the infant or a companion animal is left unattended in the vehicle 100 based on the carbon dioxide concentration inside the vehicle 100 measured by the carbon dioxide measurement unit 30.

The control unit 50 may be further included. The control unit 50 controls the vehicle 100 to notify an outside driver that an occupant is left unattended in the vehicle 100 when the determination unit 40 determines whether or not the occupant is left unattended.

When the determination unit 40 determines that an occupant is left unattended, the control unit 50 controls the vehicle 100 to notify a person located outside the vehicle 100 that the occupant is left unattended in the vehicle 100 to take an action.

The control unit 50 may control the vehicle 100 to wake up an occupant left unattended due to a sleeping by controlling an emergency light, a horn, or an internal alarm sound of the vehicle 100 or to notify a person located outside the vehicle 100.

Through this, there is an effect that it is possible to prevent an occupant from being left unattended in the vehicle 100 and life-threatening due to the increase in the carbon dioxide concentration.

The control unit 50 transmits a warning message to a predetermined contact number when the determination unit 40 determines whether or not an occupant is left unattended in the vehicle 100.

The control unit 50 may transmit a warning message to a phone number of a person located outside the vehicle 100 stored in the storage medium of the vehicle 100 or a call center provided outside to notify the situation that an occupant is left unattended in the vehicle 100.

Through this, an occupant outside the vehicle 100 can recognize whether or not an occupant is left unattended in the vehicle 100 and take an action quickly to prevent the occupant left attended in the vehicle 100 from being placed in a dangerous situation.

When the determination unit 40 determines whether or not an occupant is left unattended in the vehicle 100, the control unit 50 activates an indoor or outdoor warning light or a warning sound of the vehicle 100.

When an occupant left unattended in the vehicle 100 is an adult in a sleeping state, the control unit 50 may control a warning light such as a lighting or a display device inside the vehicle 100 to wake up the occupant. In addition, a warning sound can be generated through a speaker inside the vehicle 100 to wake up a sleeping occupant, and an adult occupant waking up from a sleep state can control the vehicle 100 to reduce the carbon dioxide concentration inside the vehicle 100.

In addition, the control unit 50 may control a horn or emergency light outside the vehicle 100 to make an occupant outside the vehicle 100 recognize that an occupant is left unattended in the vehicle 100, and the occupant outside the vehicle 100 may take measures to ensure that the unattended occupant 200 is safe.

When the determination unit 40 determines whether or not the occupant is left unattended in the vehicle 100, the control unit 50 controls the ventilation device of the vehicle 100 to adjust the carbon dioxide concentration inside the vehicle 100.

Even if the control unit 50 of the vehicle 100 notifies an outside occupant of a situation in which an occupant is left unattended in the vehicle 100 through a warning light, a warning sound, or a warning message, a situation in which the outside occupant is not recognized may occur.

To prepare for this, the control unit 50 may control the ventilation device of the vehicle 100 to reduce the carbon dioxide concentration inside the vehicle 100 when the determination unit 40 determines whether or not an occupant is left unattended in the vehicle 100.

The ventilation device may be a window of the vehicle 100 or an air conditioning device of the vehicle 100, and the control unit 50 may lower the window to ventilate the vehicle 100 or start the vehicle when the engine of the vehicle 100 is turned off and control the air conditioning device of the vehicle 100 to ventilate the vehicle 100, thereby reducing the carbon dioxide concentration.

Through this, there is an effect that the vehicle 100 can prepare itself for a dangerous situation of an occupant left unattended.

A temperature measurement unit 60 may be further included to measure an indoor temperature, and the determination unit 40 may determine that an occupant is left unattended if the indoor temperature increases to more than a predetermined temperature within a predetermined time period.

The determination unit 40 of the vehicle 100 may measure through the temperature measurement unit 60 that the temperature inside the vehicle 100 increases due to the body temperature of the occupant left unattended in the vehicle 100 as well as the carbon dioxide concentration, When the temperature increases to more than a predetermined temperature within a predetermined time period, it can be determined that an occupant is left unattended, and when the determination unit 40 determines whether the occupant is left unattended in the vehicle 100, the control unit 50 controls the vehicle 100 to notify to an occupant outside the vehicle 100.

Through this, there is an effect that it is possible to detect that an occupant is left unattended in the vehicle 100.

FIG. 5 is a flowchart of a method for detecting an occupant left unattended in the vehicle 100 according to an embodiment of the present invention.

With reference to FIG. 5, a method for detecting an occupant left unattended in the vehicle 100 according to the present invention will be described.

A method for detecting an occupant left unattended in the vehicle 100 according to the present invention includes a first detection step (S11) of detecting a situation in which the vehicle 100 is stopped or parked; a carbon dioxide measurement step (S13) of measuring the carbon dioxide concentration inside the vehicle 100; and a first determination step (S15) determining whether or not an occupant is left unattended in the vehicle 100 based on the detection that the vehicle 100 is stopped or parked in the first detection step (S11) and the carbon dioxide concentration measured in the carbon dioxide measurement step.

The method may further include a second detection step (S12) of detecting the opening or closing of a window or door of the vehicle 100 when it is detected in the first detection step that the vehicle 100 is stopped or parked.

In the carbon dioxide measurement step (S13), the increase/decrease pattern of the carbon dioxide concentration inside the vehicle 100 is measured, and a classification step (S16) may be further included. In the classification step, the occupant left unattended in the vehicle 100 is classified as an adult, an infant or a companion animal based on the increase/decrease pattern of the carbon dioxide concentration measured in the carbon dioxide measurement step after the first determination step.

In the classification step (S16), an occupant left unattended in the vehicle is classified as an adult, an infant, or a companion animal, and an infant or a companion animal that is at high risk if left unattended in the vehicle 100 can be distinguished from an adult and quickly notified to an outside.

When it is measured that the carbon dioxide concentration inside the vehicle 100 is increased to more than a first predetermined concentration for a first predetermined time in the carbon dioxide measurement step (S12), an occupant left unattended in the vehicle 100 is classified as an adult occupant in the classification step (S16).

When it is measured that the carbon dioxide concentration inside the vehicle 100 is increased to more than a second predetermined concentration for the first predetermined time in the carbon dioxide measurement step (S13), an occupant left unattended in the vehicle 100 is classified as an infant or a companion animal in the classification step (S16).

When an occupant left unattended is classified in the classification step (S16), a first control step (S20) may be further included. In the first control step, the vehicle 100 is controlled to notify to the unattended occupant or external occupant whether or not the occupant is left unattended in the vehicle 100.

When an occupant left unattended inside the vehicle 100 is classified as an infant or a companion animal in the classification step, a warning message is transmitted to a predetermined contact information and the occupant unattendance is sent to an outside through an emergency light or a horn sound of the vehicle 100 in the first control step (S20).

When an occupant left unattended in the vehicle 100 is classified as an adult in the classification step, an indoor warning sound of the vehicle 100 is activated in the first control step (S20).

A second determination step (S30) may be further included after the first control step (S20). In the second determination step, it is measured that the carbon dioxide concentration of the vehicle is increased for a second predetermined time.

When it is determined in the second determination step (S30) that the carbon dioxide concentration increases for the second predetermined time, a second control step (S31) may be further included. In the second control step, a warning message is transmitted to an external call center stored in the vehicle, or the vehicle's ventilation device is controlled to adjust the carbon dioxide concentration inside the vehicle.

Prior to the first determination step (S15), a temperature measurement step (S14) may be further included to measure the indoor temperature of the vehicle 100. In the first determining step (S15), it is determined that an occupant is left unattended if the indoor temperature increases to the predetermined temperature for a first predetermined time.

Although shown and described with respect to specific embodiments of the present invention, it will be apparent to those of ordinary skill in the art that the present invention can be variously improved and changed without departing from the spirit of the present invention provided by the following claims.

What is claimed is:

1. A system for detecting an occupant left unattended in a vehicle, comprising:
   a first detection unit configured to detect whether a vehicle is stopped or parked;
   a carbon dioxide measurement unit configured to measure a carbon dioxide concentration within the vehicle and detect an increase/decrease pattern of the measured carbon dioxide concentration;
   a determination unit in communication with the first detection unit and the carbon dioxide measurement unit and configured, in response to detecting that the vehicle is stopped or parked, to:
      determine, based on the measured carbon dioxide concentration within the vehicle, whether or not an occupant is left unattended in the vehicle;
      classify, based on the detected increase/decrease pattern of the measured carbon dioxide concentration, the occupant left unattended in the vehicle.

2. The system of claim 1, further comprising a second detection unit configured, in response to detecting that the vehicle is stopped or parked, to detect whether a window or door of the vehicle is open or closed.

3. The system of claim 1 wherein, to classify the occupant left unattended in the vehicle, the determination unit is configured, in response to the measured carbon dioxide concentration increasing to equal to or more than a first predetermined concentration within a first predetermined time period, to determine that an adult is left unattended in the vehicle.

4. The system of claim 1 wherein, to classify the occupant left unattended in the vehicle, the determination unit is configured, in response to the measured concentration of carbon dioxide increasing to equal to more than a second predetermined concentration within a second predetermined time period, to determine that an infant or animal is left unattended in the vehicle.

5. The system of claim 1, further comprising a control unit configured, in response to determining that the occupant is left unattended in the vehicle, to control the vehicle to generate a notification.

6. The system of claim 5, wherein the control unit is configured, in response to determining that the occupant is left unattended in the vehicle, to control the vehicle to transmit a message to a predetermined contact.

7. The system of claim 5, wherein the control unit is configured, in response to determining that the occupant is left unattended in the vehicle, to control the vehicle to activate a light or sound.

8. The system of claim 5, wherein:
the vehicle comprises a ventilation device, and
the control unit is further configured, in response to determining that the occupant is left unattended in the vehicle, to control the ventilation device to adjust the carbon dioxide concentration within the vehicle.

9. The system of claim 1, further comprising a temperature measurement unit configured to measure an indoor temperature of the vehicle,
wherein the determination unit is further configured, in response to the measured indoor temperature increasing to a predetermined temperature within a predetermined time period, to determine that the occupant is left unattended in the vehicle.

10. A method for detecting an occupant left unattended in a vehicle, comprising:
detecting whether a vehicle is stopped or parked;
measuring a carbon dioxide concentration within the vehicle;
detecting, based on the measured carbon dioxide concentration, an increase/decrease pattern of the carbon dioxide concentration within the vehicle; and
in response to detecting that the vehicle is stopped, performing:
determining, based on the measured carbon dioxide concentration, whether or not an occupant is left unattended in the vehicle; and
classifying, based on the detected increase/decrease pattern of the measured carbon dioxide concentration, the occupant left unattended in the vehicle.

11. The method of claim 10, further comprising, in response to detecting that the vehicle is stopped, detecting whether a window or door of the vehicle is open or closed.

12. The method of claim 10 wherein classifying the occupant left unattended in the vehicle comprises classifying the occupant as an adult in response to the measured carbon dioxide concentration increasing to equal to or more than a first predetermined concentration within a first predetermined time period.

13. The method of claim 10 wherein classifying the occupant left unattended in the vehicle comprises classifying the occupant as an infant or animal in response to the measured carbon dioxide concentration increasing to equal to or more than a second predetermined concentration within a second predetermined time period.

14. The method of claim 10 further comprising, in response to determining that an occupant is left unattended in the vehicle, controlling the vehicle to generate a notification.

15. The method of claim 14, wherein controlling the vehicle comprises, in response to determining that the occupant left unattended in the vehicle is classified as an infant or animal, controlling the vehicle to transmit a message to a predetermined contact or activate a light or sound.

16. The method of claim 14, wherein controlling the vehicle comprises, in response to determining that the occupant left unattended in the vehicle is classified as an adult, controlling the vehicle to activate an indoor warning sound.

17. The method of claim 14, further comprising determining whether the measured carbon dioxide concentration is increased within a second predetermined time period.

18. The method of claim 17, further comprising, in response to determining that the measured carbon dioxide concentration is increased within the second predetermined time period, performing at least one of:
controlling the vehicle to transmit a message to a call center; and
controlling a ventilation device of the vehicle to adjust the carbon dioxide concentration within the vehicle.

19. The method of claim 10, further comprising measuring an indoor temperature of the vehicle,
wherein determining whether or not the occupant is left unattended in the vehicle comprises determining whether or not the occupant is left unattended in the vehicle further based on the measured indoor temperature increasing to a predetermined temperature within a predetermined time period.

* * * * *